United States Patent
Pereira

[11] Patent Number: 5,308,002
[45] Date of Patent: May 3, 1994

[54] FOOD SLICER

[76] Inventor: Camilo Pereira, Flagler Center Bldg., Suite 112, 350 W. Flagler St., Miami, Fla. 33130

[21] Appl. No.: 16,942

[22] Filed: Feb. 12, 1993

[51] Int. Cl.⁵ .................. A47J 17/00; B26D 3/26; B02C 18/18; B02C 18/24
[52] U.S. Cl. .................. 241/92; 83/355; 83/666; 83/932; 99/509; 99/537; 241/282.1
[58] Field of Search .................. 99/537, 538, 567, 495, 99/509, 510; 241/92, 282, 282.1, 282.2, 37.5; 83/355, 356.3, 592, 666, 862, 932, 859; 366/314

[56] References Cited

U.S. PATENT DOCUMENTS

| | | | |
|---|---|---|---|
| 666,525 | 1/1901 | Hopkins | 99/537 |
| 1,964,290 | 6/1934 | Krause | 83/666 X |
| 2,715,927 | 8/1955 | Cupper et al. | 99/537 X |
| 2,906,195 | 9/1959 | Zysset | 99/509 X |
| 3,085,607 | 4/1963 | Schottle | 241/282.2 |
| 4,448,100 | 5/1984 | Breeden | 83/355 |
| 4,458,848 | 7/1984 | Williams | 241/92 |
| 4,542,857 | 9/1985 | Akasaka | 241/92 X |
| 4,601,429 | 7/1986 | Stottmann et al. | 241/92 |
| 4,817,481 | 4/1989 | Homma | 83/355 |
| 4,921,174 | 5/1990 | Okada et al. | 366/314 X |

FOREIGN PATENT DOCUMENTS

| | | | |
|---|---|---|---|
| 387165 | 2/1933 | United Kingdom | 241/92 |
| 2091085 | 7/1982 | United Kingdom | 83/666 |

Primary Examiner—Timothy F. Simone
Attorney, Agent, or Firm—Malloy & Malloy

[57] ABSTRACT

A hand-driven food slicer which includes a gear box with a shaft extending from it and within the gear box there is a driven gear and a driving gear, the driven gear being adapted to rotate a slicing mechanism in a housing atop the device which has a charging opening and an exit opening and slicer includes a driving gear in the gear box in driving engagement with the driven gear on a shaft with a handle which extends exteriorly of the gear box.

7 Claims, 2 Drawing Sheets ced for

FOOD SLICER

SUMMARY OF THE INVENTION

Field of the Invention

This invention relates to a food slicer for use in a commercial establishment which is hand operated.

In the past, there have been numerous types of food slicers. This invention is of an improved food slicer. It includes a clamping device to clamp the slicing machine to a support surface and extending upwardly from the clamping device is a gear housing in which there is a rod journaled for rotation which is provided with a driven gear keyed to it. In mesh with this driven gear is a driving gear which has a shaft which extends from the gear housing. Thus, the shaft can be rotated exteriorly of the gear box of the machine. To the upper end of the gear box and within a housing affixed to the gear box, there is a disc which carries slicing blades so that, when food items are charged through either of two openings at the top, and the rod is turned, the food slicer slices the food.

It is an object of this invention to provide an inexpensive, strong, durable food slicer for manual operation in commercial food establishments.

BRIEF DESCRIPTION OF THE DRAWINGS

Referring to the drawings.

DESCRIPTION OF THE PREFERRED EMBODIMENT

Figure 1:
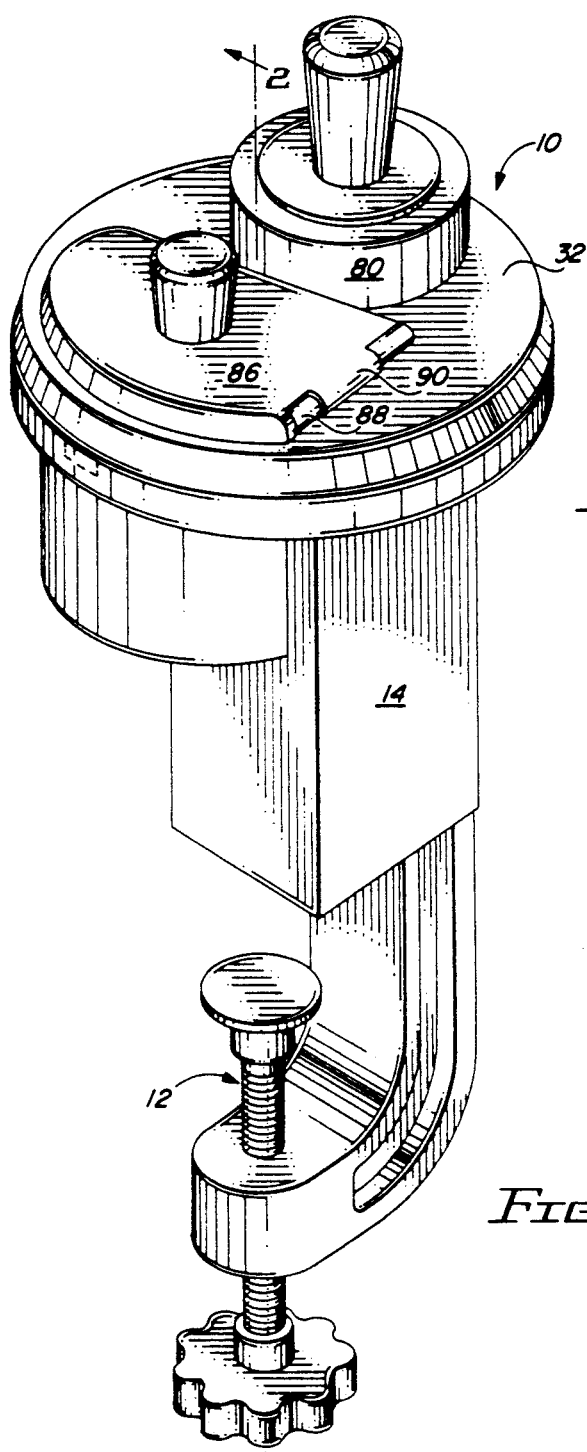
FIG. 1 is a perspective view of a food slicer according to this invention.
Figure 3:
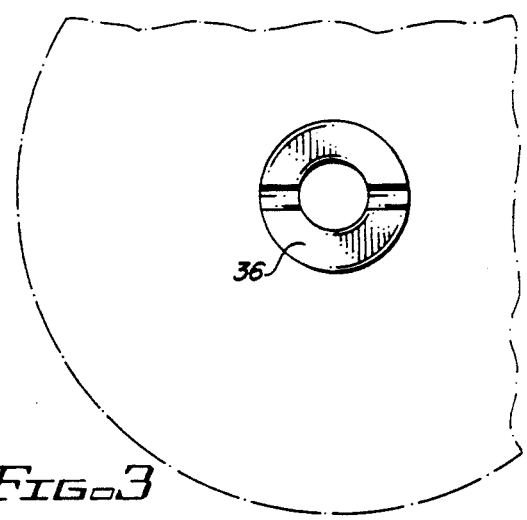
FIG. 3 is a bottom plan view of the hub which attaches to the upper end of the rod within the gear housing of the food slicer as further seen in FIG. 4.
Figure 4:
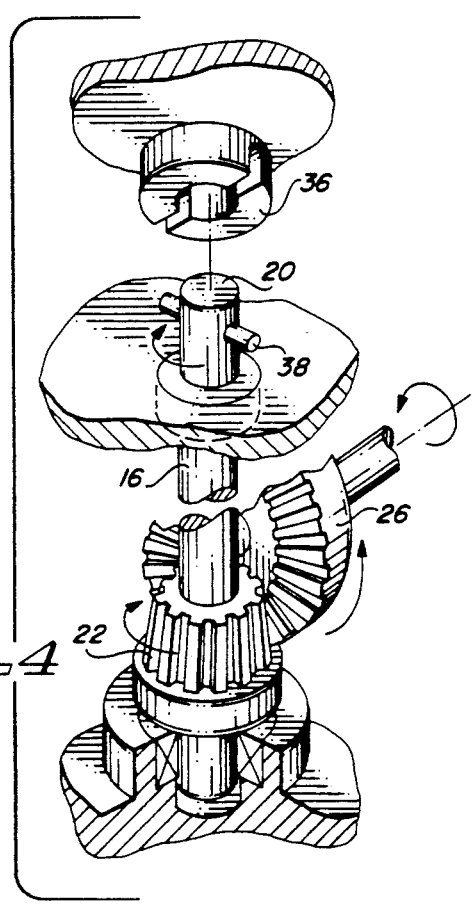
FIG. 4 is a perspective illustrating the operation of the mechanism seen in FIGS. 2 and 3.
Figure 5:
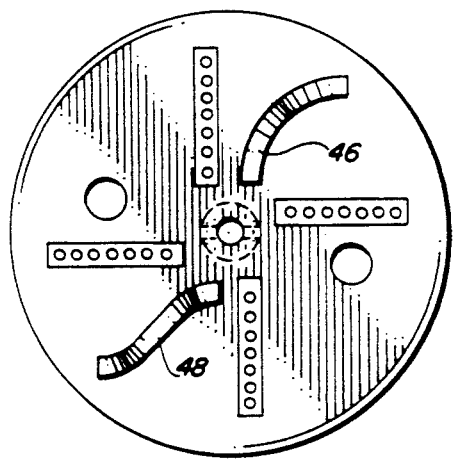
FIG. 5 is a plan view of one type of slicing blade.
Figure 6:
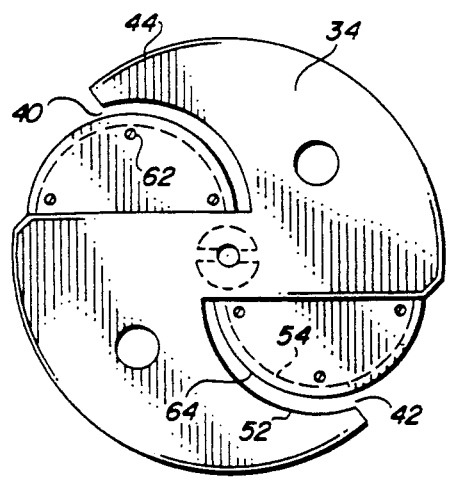
FIG. 6 is a plan view of an alternative type of slicing mechanism.

In the drawings, there is illustrated a food slicer 10 which may include a clamp means similar to that designated by the numeral 12 to secure it to the edge of a table. The slicer 10 includes a gear box or gear housing 14. A shaft 16 is journaled at its lower end 18 for rotation in the gear box. The upper end of the shaft 16 extends upwardly from the gear box, as at 20. The shaft is provided with a gear 22 keyed to it for rotation with the shaft. From the gear box, a driving shaft 24 extends laterally and within the gear box a driving gear 26 is fixed to it. The outer end 28 of the driving shaft is provided with a crank arm 30 to rotate the driving gear 26 and the driven gear 22 which mesh together to rotate the shaft 16. Within a slicing housing 32, see at the top of FIG. 1, to be described hereinafter, there is keyed for rotation with the shaft a blade carrying disc 34, see also in FIG. 6. As seen in FIG. 4, the disc 34 is generally circular as seen in plan and it includes a slotted hub 36 which receives a diametrically extending pin 38 which keys the disc to the shaft for rotation with it within the slicing housing 32. As seen in FIG. 6, the slicing disc includes two semi-circular cutouts 40 and 42 which extend from the disc periphery 44 about to the disc central zone and outer surface of the slotted hub. These cutouts 40, 42 each have a center of curvature which are diametrically opposed to one another. As seen in FIG. 5, alternative slicing portions may be provided, see at 46 and 48. In a preferred embodiment, the disc is about nine inches in diameter. The inner end of each cutout is equi-spaced from the disc center and define two spaced chord segments with a center in diametrical opposition to one another. As seen from above, the cutouts 40 and 42 have a leading edge 52 spaced about one quarter inch from the leading edge 14 of a semi-circular cutting blade. The slicing edge of each of the blades is beveled as indicated at 54. In the preferred embodiment to the upper surface of the disc, a pair of semi-circular cutting blades are mounted as by the headed screws 62, preferably three screws for each blade. For this purpose, threaded recesses are provided in the disc for passage of the screws through matingly arranged holes in each blade. In the preferred embodiment, the leading edge or slicing edge 64 of each blade is positioned and spaced about one quarter inch from the leading edge 52 of one of the cutouts. The lower surface of each of the blades is beveled at the leading edge.

In use, the blades are rotated in the housing and are adapted to slice food items rapidly, such as a carrot, inserted from above through an opening and into the slicing housing or chamber to exit as slices from the floor of the slicing housing.

Referring to the slicing housing 32, it is composed of an upper dome-shaped portion 68 and a mating lower inverted dome-shaped portion 70. The central zone of the lower slicing housing portion 70 is fixed to the roof of the gear box by fastener means such as screws which extend threadably downwardly from the lower dome-shaped slicing housing portion to mount it to the gear box. The floor of the lower inverted dome-shaped slicing housing portion is provided with a discharge opening 72 which is preferably bounded by a skirt or chute for the sliced product to exit the device. The upper dome-shaped slicer housing portion is provided with charging openings, preferably two in number, see 76 and 78. In the case of each charging opening, a peripheral wall or upstanding portion is preferably provided as at 80 and 82 which aid in guiding and orienting a food item to be sliced in a generally perpendicular relation relative to the slicing plane. In the case of the round opening 76, a removable plunger or stopper may be provided to close that opening; and in the case of the generally oval-shaped opening 82, a door 86 with a handle is provided. The door is hingedly connected to the slicer housing by suitable clevis means 88, the door being sized to cover the opening when the door edge abuts the edge of the opening along its pivot axis, as at 90. The round opening 80 is preferably about three inches in diameter and the larger generally oval-shaped opening 82 is about one and one-half inches across its main axis and three and one-half inches across its minor axis.

Figure 7:
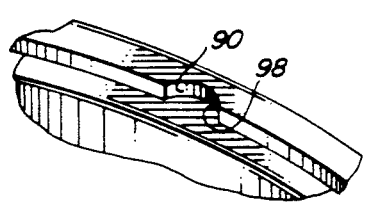
FIG. 7 is a perspective view of a recess with an entrance groove in the upper slicing housing portion described hereinafter.
Figure 8:
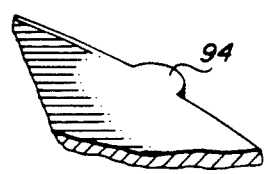
FIG. 8 is a partial view in perspective showing a nib which is used for connecting together with a recess shown in FIG. 7 through an entrance groove upon relative turning of the upper housing slicing portions.
Figure 9:
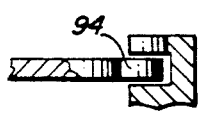
FIG. 9 illustrates the nib shown in FIG. 8 seated in the groove shown in FIG. 7.
Figure 2:
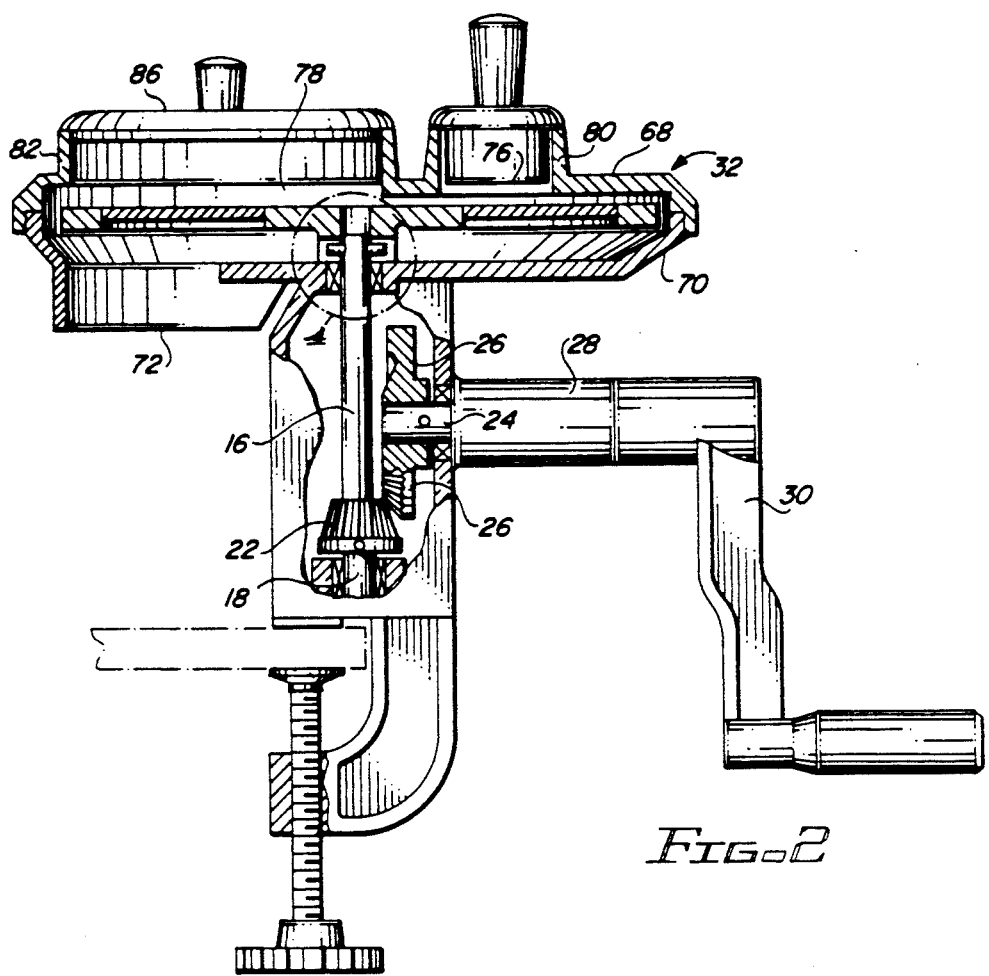
FIG. 2 is a view partially in cross-section illustrating the invention.

Referring to FIGS. 7, 8 and 9, means are provided to removably interconnect the slicer housing upper and lower dome-shaped portions. This may include a pair of diametrically opposed recesses such as that designated by the numeral 90, on one of the slicer housing portions and companionately positioned nibs 94 on the other slicer housing portion. Each of the recesses has an entrance guide channels 98, so that by rotating these portions relative to one another, the nibs 94 will be guided along the channels 98 into the recess,, see 90, and be captivated in the recesses.

The leading edge of each of the slicing edges may be as shown or may be serrated in various fashions to produce decoratively configured slices.

While this invention has been shown and described in what is considered to be a practical and preferred embodiment, it is recognized that departures may be made within the spirit and scope of this process which should therefore not be limited except as set forth in the claims which follow hereinafter within the doctrine of equivalents.

What is claimed is:

1. A food slicer, including:
   A) A gear box having an upper end and a lower end,
   B) means to change the gear box to the edge of a table,
   C) a shaft with a lower end and an upper end extending from the upper end of said gear box,
   D) a driven gear secured to said lower end of said shaft and in said gear box,
   E) a driving gear in said gear box in driving engagement with the driven gear and including a handle means exterior of the gear box and shaft means interconnecting the handle and driving gear to rotate the driving gear, driven gear, and shaft in said gear box,
   F) a blade carrier disc keyed on the extending upper end of said shaft for rotation therewith,
   G) said blade carrier disc having an upper surface, a lower surface, a periphery and a central zone and at least one arcuate cutout extending from the disc periphery to the disc central zone,
   H) a blade mounted on said upper disc surface and having a cutting edge extending into the projection along said cutout to cut slices of food oriented generally perpendicularly to said upper surface and bearing against said upper blade carrier disc surface,
   I) a two-piece housing define a slicing chamber encapsulating said blade and carrier disc including a charging opening and a discharge opening for slices below the level of said charging opening, and
   J) releasable lock means to maintain the housing in slicing chamber defining relation and to separate the housing into two pieces for cleaning the chamber in the housing.

2. The slicer as set forth in claim 1 wherein two of said arcuate cutouts are provided on said blade carrier disc each having a radius of curvature of substantially the same length and the centers of said radii of curvature are diametrically spaced from one another a common radial distance from said central zone.

3. The slicer as set forth in claim 2 wherein door means are provided on said housing and moveable between a first position closing said charging opening and hinge means interconnect said door and housing for swinging movement between said positions.

4. The slicer as set forth in claim 3 wherein said hinge means includes clevis connection means in said housing and hingedly interconnecting said door and housing.

5. The slicer as set forth in claim 5 wherein said charging opening is bounded by an upstanding rim on said housing to orient a food item inserted into said charging opening into generally perpendicular relation relative to said carrier disc and blade.

6. The slicer as set forth in claim 1 wherein the cutting edge traces a fair curve.

7. The slicer as set forth in claim 1 wherein the cutting edge is irregular.

* * * * *